United States Patent
Lee

(10) Patent No.: US 7,409,394 B2
(45) Date of Patent: Aug. 5, 2008

(54) METHOD FOR AUTOMATICALLY MANAGING INFORMATION USING HYPERLINK FEATURES OF A MOBILE TERMINAL

(75) Inventor: Jong-Soo Lee, Seoul (KR)

(73) Assignee: LG Electronics Inc., Seoul (KR)

( * ) Notice: Subject to any disclaimer, the term of this patent is extended or adjusted under 35 U.S.C. 154(b) by 412 days.

(21) Appl. No.: 10/902,801

(22) Filed: Aug. 2, 2004

(65) Prior Publication Data

US 2005/0050032 A1 Mar. 3, 2005

(30) Foreign Application Priority Data

Aug. 30, 2003 (KR) .................... 10-2003-0060594

(51) Int. Cl.
*G06F 17/30* (2006.01)
(52) U.S. Cl. ............................ 707/10; 707/3
(58) Field of Classification Search ............. 707/1–10, 707/100–104.1, 200–2; 704/277; 713/176; 455/556; 370/401
See application file for complete search history.

(56) References Cited

U.S. PATENT DOCUMENTS

| 2001/0029455 | A1* | 10/2001 | Chin et al. ............... 704/277 |
| 2002/0151327 | A1* | 10/2002 | Levitt ..................... 455/556 |
| 2004/0111678 | A1* | 6/2004 | Hara et al. ................ 715/526 |
| 2005/0283609 | A1* | 12/2005 | Langford .................. 713/176 |
| 2006/0165104 | A1* | 7/2006 | Kaye ...................... 370/401 |

FOREIGN PATENT DOCUMENTS

| CN | 1416080 | 5/2003 |
| JP | 2003-108495 | 4/2003 |
| KR | 10-2000-0008813 | 2/2000 |
| KR | 10-2002-0050373 | 6/2002 |
| KR | 2002-0050373 | 6/2002 |
| KR | 2003-0037875 | 5/2003 |
| KR | 10-2004-0085955 | 10/2004 |

OTHER PUBLICATIONS

Pasi Valkkynen et al. "Evaluating touching and pointing with a mobile terminal for physical browsing", (2006), ACM, NY, NY, ACM Proceedings of the 4th Nordic conference, vol. 189, pp. 28-37.*
Rainer Simon et al., "A mobile application framework for the geospatial web", (2007), ACM, NY, NY, International World Wide Web Conference, Session: Pervasive web and mobility, pp. 381-390.*
Chinese Office Action dated Nov. 3, 2006 (English translation attached).
Korean Office Action dated Aug. 31, 2005.

* cited by examiner

*Primary Examiner*—Diane Mizrahi
(74) *Attorney, Agent, or Firm*—Ked & Associates, LLP

(57) ABSTRACT

A system and method for managing information of a mobile terminal automatically generates a link to related information in association with one or more separate function databases in the mobile terminal. All information stored in each function database is also stored in a link database to allow other functions to refer to them. When a certain function is used, its related information is automatically searched for in the link database. If related information exists, a hyperlink to the related information is automatically generated, so that a user can simply use the related information as necessary.

32 Claims, 4 Drawing Sheets

FIG. 1A
RELATED ART

| PHONE BOOK | |
|---|---|
| KIM | 111-2222 |
| PARK | 222-3333 |

FIG. 1B
RELATED ART

| NAME | GROUP | MOBILE PHONE | HOME | BIRTH DATA |
|---|---|---|---|---|
| KIM | FAMILY | 011-333-4444 | 111-2222 | 19790505 |
| PARK | FRIEND | 016-444-5555 | 222-3333 | 19801010 |

METHOD FOR AUTOMATICALLY MANAGING INFORMATION USING HYPERLINK FEATURES OF A MOBILE TERMINAL

BACKGROUND OF THE INVENTION

1. Field of the Invention

The present invention generally relates to electronic information management, and more particularly to a system and method for automatically managing information in a processor-driven device including but not limited to personal digital assistants, handheld computers, and mobile communication terminals.

2. Background of the Related Art

As mobile terminals become more popular, users are expected to rely on supplementary functions to a greater extent. These functions include, for example, an address book, phone book, memo management, and schedule management functions as well as others. To support these functions, mobile terminals are equipped to store large amounts of diverse information in their memories.

Although supplementary functions of mobile terminals are being continuously added to meet user satisfaction, methods for managing information to support these functions are not being improved sufficiently or at the same rate. More specifically, information in a mobile terminal is stored and managed separately and different forms of that information are not associated with each other in terms of their use. In addition, in existing mobile terminals, in order for a user to use desired information, the user must tediously search lower levels of a main tree structure for a corresponding supplementary function or must use a search function in a corresponding menu.

Consider, for example, the case where a user has an appointment with person A and stores an appointment location and time in a schedule management menu of his mobile terminal. Later, when the user checks the schedule, only the stored content is displayed, without any information about person A. Thus, in order to place a phone call to person A, the user must separately search the phone number of person A from a phone book menu in the mobile terminal.

Thus, in related-art systems, while the user is using a certain function, the currently executed function must be terminated when related information is needed to be searched. The desired information then needs to be separately searched by executing a different function, and then the original function needs to be executed for the intended operation. As a result, convenience of the user has not been improved compared to other improved functions. On the contrary, the user's inconvenience has been increased because the user needs to search and obtain the desired information by performing several different functions.

The above references are incorporated by reference herein where appropriate for appropriate teachings of additional or alternative details, features and/or technical background.

SUMMARY OF THE INVENTION

An object of the invention is to solve at least the above problems and/or disadvantages and to provide at least the advantages described hereinafter.

Another object of the present invention is to provide a method for automatically managing information using hyperlink features of a mobile terminal, which features comprehensively manage information by associating multiple menus with one another and provide a convenient search function to the user.

To achieve at least these and other objects and advantages in whole or part, the present invention provides a method for automatically managing information using hyperlink features of a mobile terminal, including: a step in which each representative information of all information stored in each function database in a mobile terminal is registered as index information of a link database; a step in which when a user uses a function connected to the link database, it is searched whether an inputted word is registered in the link database whenever a word is inputted; a step in which if the inputted word is a registered word in the link database, a hyperlink is automatically generated and displayed to related information of the link database; and a step in which when a cursor is moved to the linked word and a certain select key is inputted, database information of the linked function is outputted.

Additional advantages, objects, and features of the invention will be set forth in part in the description which follows and in part will become apparent to those having ordinary skill in the art upon examination of the following or may be learned from practice of the invention. The objects and advantages of the invention may be realized and attained as particularly pointed out in the appended claims.

BRIEF DESCRIPTION OF THE DRAWINGS

FIGS. 1A and 1B are exemplary views showing a phone book function and the construction of a database generally provided in a mobile terminals of the related art.

DETAILED DESCRIPTION OF PREFERRED EMBODIMENTS

The present invention utilizes a site linking concept for Web pages of the Internet to manage the access of information stored in a mobile terminal. In implementing this concept, all information stored in each function database of the mobile terminal is also stored in a link database, so that it can be used to reference information relating, for example, to a different function. In accordance with one embodiment, when a certain function is used, a check is performed to determine whether any related information is stored in the link database. If related information exists in the link database, a hyperlink to the related information is automatically generated, so that a user can simply select the hyperlink to access the related information as necessary. The hyperlink feature refers to the generation of a connection point that connects information (e.g., electronic documents) to allow, for example, the user to more easily access each electronic document or information.

FIGS. 1A and 1B are exemplary views showing a phone book function and the construction of a database generally provided in a mobile terminal of the related art. When a phone book function is selected by the user to search for a phone number to be called, a name and a representative phone number is merely displayed on a screen, as shown in FIG. 1A. At the same time, a phone book database of the terminal may include additional diverse information such as additional phone numbers, date of birth information, and information regarding the relationship to the user as shown in FIG. 1B.

In the present invention, the receiving party's name (e.g., the representative information of the phone book or an address book) may be registered as an index word in association with a link in a database. If the user creates a new memo or schedule and if the registered index word is inputted, a link (e.g., a hyperlink) is automatically generated to connect the index word with the related information stored in the database. The link allows the user to easily check for any additional related information, thereby providing a comprehensive information search function in the mobile terminal.

In addition to the method of registering the name in the phone book or an address book as an index word, a word indicating a specific event such as a birthday (date of birth: DOB), an appointment, a meeting or the like in a memo (or schedule), or a word indicating a group such as a 'family' or 'friends,' may be designated as representative information and registered as an index word.

The link database preferably includes an index information field for storing all the representative information as index information and a link information field for moving information to a function database where all the information are actually stored.

Figure 2A:
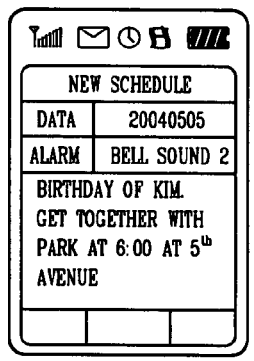
FIGS. 2A through 2C illustrate a method for managing information in a mobile terminal having a hyperlink feature in accordance with one embodiment of the present invention.
Figure 2B:
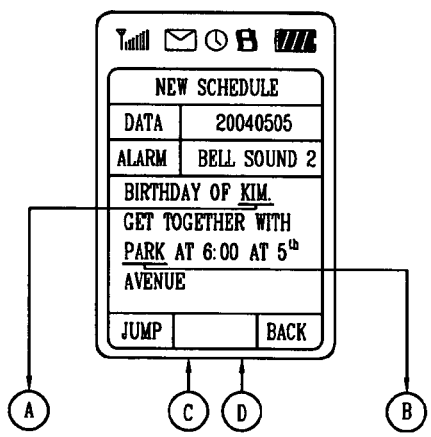
Figure 2C:
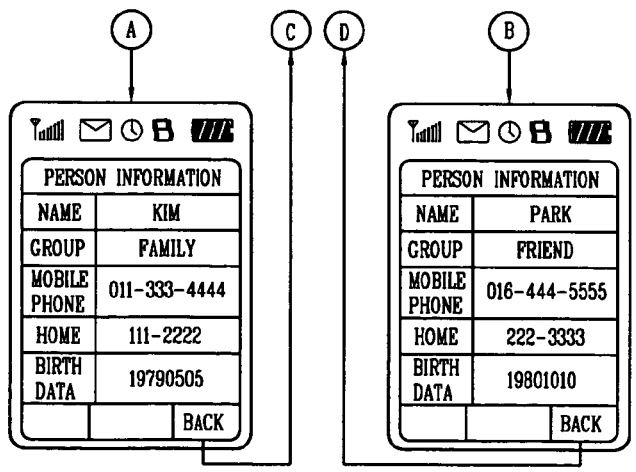

FIGS. 2A through 2C illustrate a method for managing information in a mobile terminal having a hyperlink feature in accordance with one embodiment of the present invention. When a user executes a schedule function to create or edit information (e.g., a date or a content) as shown in FIG. 2A, an automatic search is performed whenever a word is input to determine whether the input word has previously been registered as an index word in the link database. If the input word is an index word, a link is automatically generated and linked words are distinctively displayed (e.g., underlined) as shown in FIG. 2B.

In case of the related art, if the user desires to view information related to the linked word, the current function needs to be terminated to newly and separately execute the phone book function. And after the phone book function is executed, corresponding name information such as 'KIM' or 'PARK' is searched. In contrast, in the present invention the user simply moves the cursor (or other type of indicator) to the linked word and selects a certain feature (using, for example, an input key) As a result, the terminal display will show information related to the linked word as shown in FIG. 2C.

To be immediately directed to the related information, a certain select key, (e.g., a jump button and a back button) can be provided in the menu by software. For example, when the jump button is selected, information related to a corresponding link is shown. When the back button is selected, a previous information screen can be shown. By using the hyperlink feature with a jump button and a back button, the number of keys or keystrokes the user needs to select can be substantially reduced, thereby enhancing the user's convenience.

Figure 3:
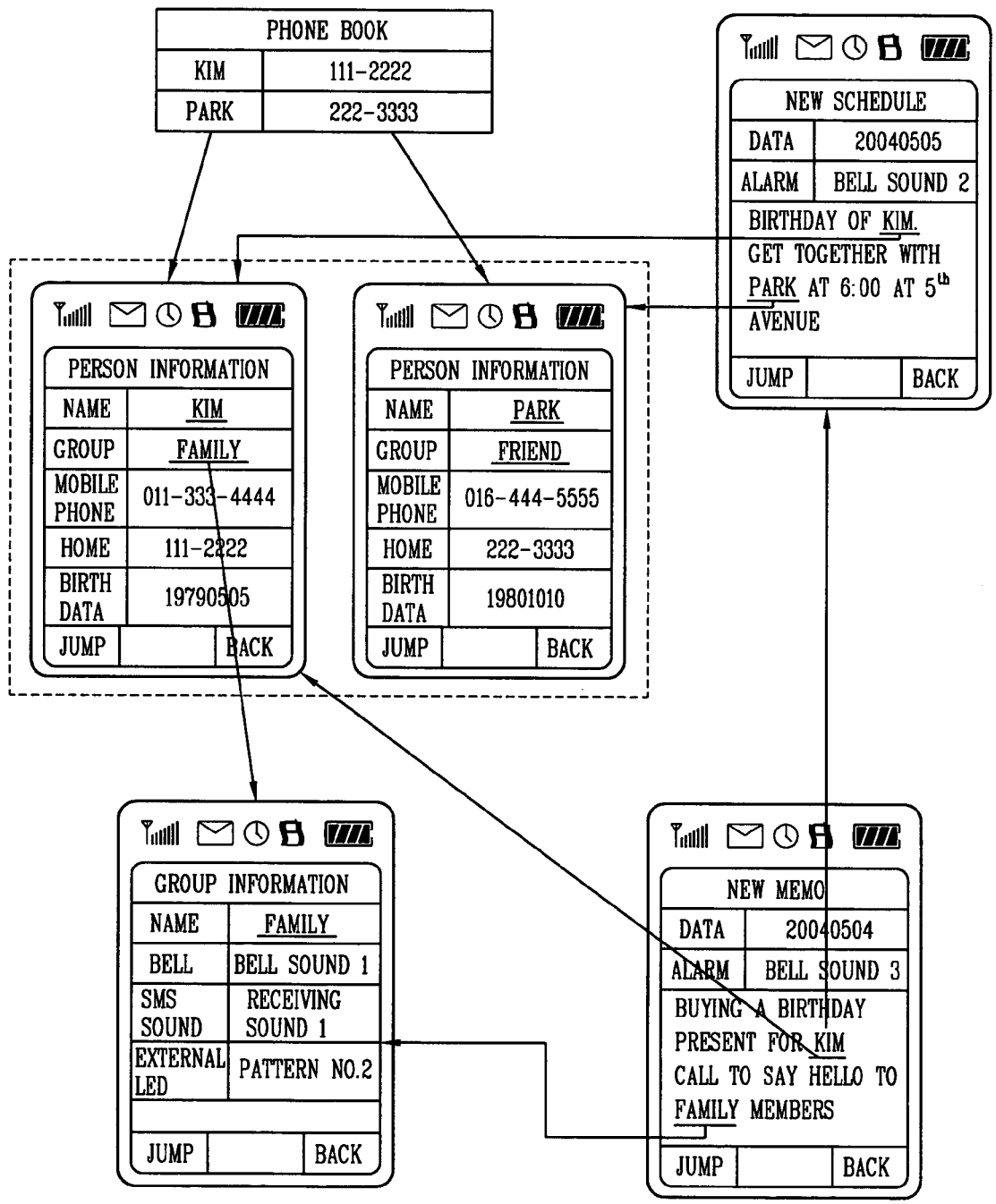
FIG. 3 illustrates a method for managing information using a mobile terminal having a hyperlink feature in accordance with another embodiment of the present invention.

FIG. 3 illustrates a method for managing information using a mobile terminal having hyperlink features in accordance with another embodiment of the present invention. This figure shows a process of automatically setting and managing hyperlink features by connecting (linking together) a schedule function, a memo function and a phone book function.

The databases of these functions are independently maintained but mutually connected together, and a new function which causes information in these databases to be related by hyperlinking feature of the present invention is added, while preferably still employing related art supplementary functions. As shown in FIG. 3, group information can be viewed by the user through various methods.

Then, when the user searches and selects desired information (e.g., a particular name), more detailed information on the corresponding person is outputted. If a group setting of the detailed information is desired to be changed, options allowing the user to change the group information is displayed.

When the user creates some content using the schedule function, as mentioned above, the currently displayed information (screen) can be simply switched to a different function (such as to the phone book function) by employing the automatic link function. If the user wants to use the memo function, then while the user is creating, editing or checking some content information, if a word (such as 'KIM', a birth date, family, or the like) has been previously registered in the link database, a link is automatically generated and distinctively displayed to the user. The user can then move the cursor to the linked word and select an option (e.g., a jump button) in order to view a corresponding schedule (such as the 'schedule function') related to the linked word or view the group information stored in the phone book.

The method for automatically managing information using hyperlink features of a mobile terminal therefore has at least the following advantages. Because words that are generally used in a PDA (personal digital assistant) function, such as a phone book, memo, schedule, or the like, are managed as an object for linking, and a link is automatically generated and provided when the user inputs new information or edits existing information, the user can access the related information by simple manipulations provided by hyperlinks. In case of mobile terminals having a multi-tasking capability, after the linked information is checked, the previously executed function can still be used even if its function is terminated.

Figure 4:
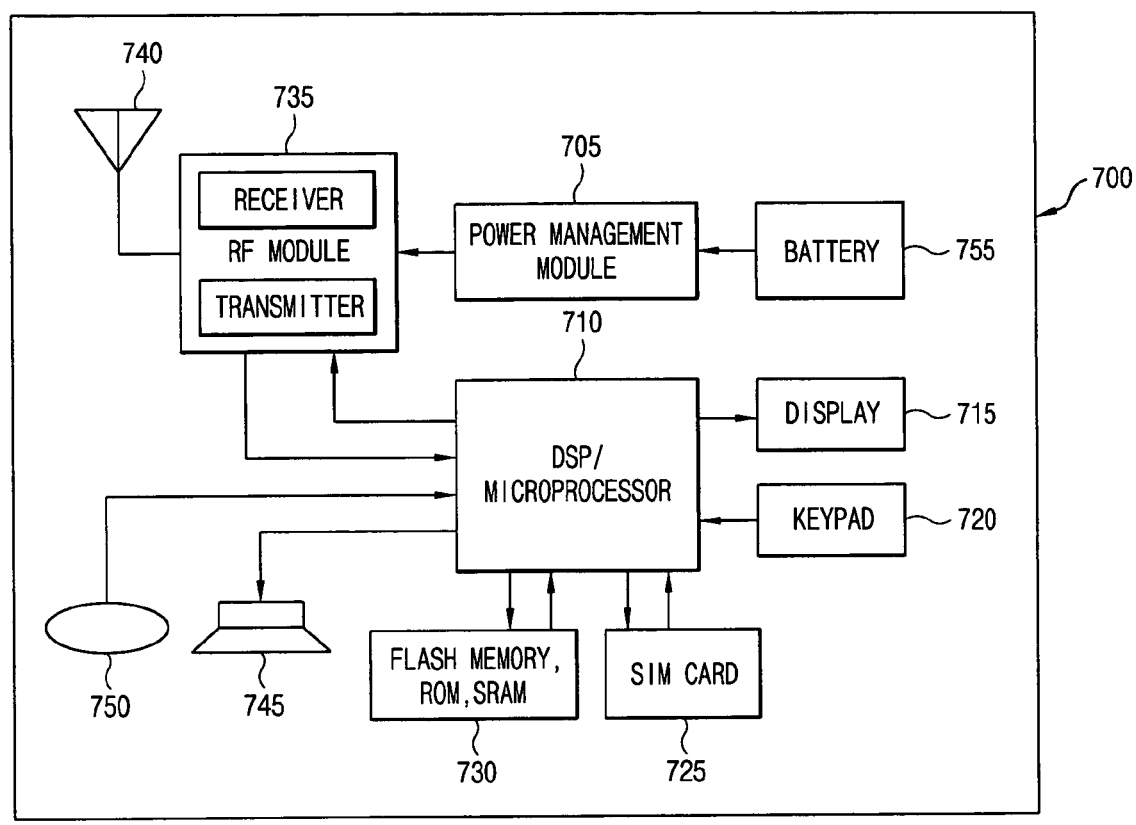
FIG. 4 is a block diagram of a mobile terminal according to are embodiment of the present invention.

FIG. 4 is a block diagram of a mobile terminal 700 according to the preferred embodiment of the present invention. The mobile terminal comprises a processor (or digital signal processor) 710, RF module 735, power management module 705, antenna 740, battery 755, display 715, keypad 720, memory 730, Subscriber Identity Module (SIM) card 725 (which may be optional), speaker 745 and microphone 750.

In operation, a user enters instructional information, such as a telephone number, for example, by pushing the buttons of a keypad 720 or by voice activation using microphone 750. Microprocessor 710 receives and processes the instructional information to perform the appropriate function, such as to dial the telephone number. Operational data may be retrieved from the SIM card 725 or the memory module 730 to perform the function. Furthermore, the processor 710 may display the instructional and operational information on the display 715 for the user's reference and convenience.

The microprocessor issues instructional information to the RF module 735 to initiate communication, for example, to transmit radio signals comprising voice communication data. The RF module 735 comprises a receiver and a transmitter to receive and transmit radio signals. An antenna 740 facilitates the transmission and reception of radio signals. Upon receiving radio signals, the RF module 735 may forward and convert the signals to baseband frequency for processing by the processor 710. The processed signals would be transformed into audible or readable information outputted via the speaker 745 or display 715.

As such, the present invention provides a mobile terminal apparatus for wireless communications, comprising an input device to allow a user to input information; a registering unit to register particular inputted information into a link database; a searching unit to search the link database while the user performs an information management function, to determine whether any related information pertaining to the registered information exists in other databases or memory; and a generating unit to generate a link between the registered information and any existing related information. The link generated by the generating unit may be a hyperlink displayed to the user. Also, the input device allows the user to select the generated hyperlink to access the related information.

It should be noted that at least one of the registering unit, the searching unit, and the generating unit could be a processor of the mobile terminal. Namely, one or more processors in the mobile terminal can perform the functions of at least one of the registering unit, the searching unit, and the generating unit. Here, the processor can execute software code implemented in various types of memory, wherein the software code is related to the functions of the registering, searching, and generating units.

Additionally, the information management function comprises a PDA (personal digital assistant) function, wherein the PDA function allows the user to input and store text and/or multimedia information.

The foregoing embodiments and advantages are merely exemplary and are not to be construed as limiting the present invention. The present teaching can be readily applied to other types of methods and apparatuses. The description of the present invention is intended to be illustrative, and not to limit the scope of the claims. Many alternatives, modifications, and variations will be apparent to those skilled in the art. In the claims, means-plus-function clauses are intended to cover the structure described herein as performing the recited function and not only structural equivalents but also equivalent structures.

What is claimed is:

1. A method for managing information in a mobile terminal, comprising:
    registering an index word into a link database;
    activating a first function of the mobile terminal which causes the registered index word to be displayed;
    searching the link database to determine whether information relating to the registered index word is stored in the terminal, said searching performed while the first function is being performed;
    automatically generating a hyperlink to the related information for results of the search that indicate that the related information is stored in the terminal;
    modifying the registered index word to cause the first function to display the hyperlink; and
    activating a second function of the mobile terminal for the displayed hyperlink that is selected, wherein the second function displays information relating to selected hyperlink and wherein the first and second functions are independent internal functions of the terminal and the hyperlink is not used to access the Internet.

2. The method of claim 1, wherein the registered index word includes:
    a word indicating one of a name, memo, birth date, appointment, meeting or a word indicating a group of persons in a phone book or in an address book.

3. The method of claim 1, wherein the first and second functions of the terminal are selected from the group consisting of a schedule function, memo function, address function, and phone book function.

4. The method of claim 1, wherein when a first select key is activated, the database information corresponding to the second linked function is displayed by the second function.

5. The method of claim 4, further comprising:
    returning to a previous information page when a second select key is activated after the database information of the linked corresponding function is outputted.

6. The method of claim 1, wherein the link database comprises:
    an index information field for registering representative information of information stored in each of a plurality of function databases; and
    a link information field for referencing one or more of the function databases where related information of the representative information is stored.

7. A method for automatically managing information of a mobile terminal, comprising:
    registering index information in a link database, the index information representing information stored in each of a plurality of function databases of the mobile terminal;
    during use of a first function connected to the link database, searching whether an input word displayed by the first function is registered in the link database;
    receiving results of the search indicating that the input word is registered in the link database, and automatically generating and displaying a hyperlink to related information of the link database, wherein the input word is modified to display the hyperlink;
    activating a second function of the mobile terminal for a cursor that is moved to the hyperlink and for a first select key that is activated; and
    outputting information from one of the function databases associated with the second function, said output information corresponding to the input word modified to display the selected hyperlink, wherein the first and second functions are independent internal functions of the terminal and the hyperlink is not used to access the Internet.

8. The method of claim 7, wherein the representative information includes a word indicating a name, memo, birth date, appointment, meeting, or a word indicating a group of persons in a phone book or in an address book.

9. The method of claim 7, wherein the link database comprises:
    an index information field for registering representative information of information stored in each of the function databases; and
    a link information field for referencing one or more of the function databases where related information of the representative information is actually stored.

10. The method of claim 7, further comprising:
    returning to a previous information page after database information of a linked function is output in response to activation of a second select key.

11. A mobile terminal apparatus for wireless communications, comprising:
    an input device which allows a user to input information for display by a first function of the mobile terminal;
    a registering unit which registers input information into a link database;
    a searching unit which searches the link database while the user performs an information management function, to determine whether information relating to the registered information exists in at least one other database corresponding to or in a memory accessible by a second function of the mobile terminal; and
    a generating unit which generates a link between the registered information and the related information, the generating unit modifying the input information displayed by the first function to display the link, wherein the first and second functions are independent internal functions of the terminal and the link is not used to access the Internet.

12. The apparatus of claim 11, wherein the link generated by the generating unit is a hyperlink displayed to the user.

13. The apparatus of claim 12, wherein the input device allows the user to select the generated hyperlink to access the related information.

14. The apparatus of claim 13, wherein at least one of the registering unit, the searching unit, and the generating unit is a processor of the mobile terminal.

15. The apparatus of claim 14, wherein the processor executes software code implemented in memory, and wherein the software code is related to functions of the registering, searching, and generating units.

16. The apparatus of claim 11, wherein the information management function comprises a PDA (personal digital assistant) function.

17. The apparatus of claim 16, wherein the PDA function allows the user to input and store text information.

18. The apparatus of claim 16, wherein the PDA function allows the user to input and store multimedia information.

19. A method for controlling a mobile terminal, comprising:
   displaying a hyperlink on a screen of the terminal, the hyperlink displayed by a first function of the mobile terminal;
   retrieving information stored in a terminal memory in response to selection of the hyperlink by a user; and
   activating a second function of the mobile terminal based on the selected hyperlink, wherein the second function displays information relating to the hyperlink selected by the user and wherein the first and second functions are independent internal functions maintained by the terminal and the hyperlink is not used to access the Internet.

20. The method of claim 19, wherein the hyperlink is displayed in association with a function of the mobile terminal.

21. The method of claim 20, wherein the function is one of a phone book, address book, memo, or scheduling function.

22. The method of claim 19, wherein the hyperlink corresponds to an index word stored in memory.

23. The method of claim 22, wherein retrieving said information includes:
   pre-storing the index word in association with said information; and
   retrieving said information from the memory for display by referencing the index word.

24. The method of claim 19, wherein said information is retrieved when a first terminal key is activated.

25. The method of claim 24, further comprising:
   displaying a previous screen when a second terminal key is activated.

26. A method for controlling a mobile terminal, comprising:
   storing first information in a memory of the terminal;
   storing second information in the memory;
   automatically generating a hyperlink linking the first and second information for at least one word that is displayed by a first function of the terminal based on the first information; and
   activating a second function of the terminal in response to selection of the hyperlink by a user, the second function displaying the second information linked by the hyperlink, wherein the first and second functions are independent functions of the terminal, wherein the first and second functions are independent internal functions of the terminal and the hyperlink is not used to access the Internet.

27. The method of claim 26, wherein the first and second information are stored in different databases of the terminal.

28. The method of claim 27, wherein generating a hyperlink includes:
   storing information in a link database linking the first information and second information in the different databases.

29. The method of claim 28, wherein the information in the link database corresponds to at least one word in the first information, when the first information is displayed on a screen of the terminal.

30. A method for controlling a mobile terminal, comprising:
   receiving information from a terminal input device for display, said information being received through a first function of the terminal;
   recognizing an index word in said information during display of the index word by the first function;
   automatically creating a hyperlink corresponding to the index word;
   activating a second function in response to selection of the index word, the second function displaying information relating to the hyperlink, wherein the first and second functions are independent internal functions maintained by the terminal and the hyperlink is not used to access the Internet.

31. The method of claim 30, further comprising:
   displaying the hyperlink in association with the index word.

32. The method of claim 30, wherein the received information relates to one of a phone book, address book, memo, or scheduling function of the terminal.

* * * * *